(12) United States Patent
Korenaga et al.

(10) Patent No.: US 6,989,114 B1
(45) Date of Patent: Jan. 24, 2006

(54) MICRO-SHAPE TRANSCRIPTION METHOD, MICRO-SHAPE TRANSCRIPTION APPARATUS, AND OPTICAL-COMPONENT MANUFACTURE METHOD

(75) Inventors: Tsuguhiro Korenaga, Katano (JP); Makoto Umetani, Izumi (JP); Hiroyuki Asakura, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 15 days.

(21) Appl. No.: 09/609,250

(22) Filed: Jun. 30, 2000

(30) Foreign Application Priority Data

Jul. 13, 1999 (JP) .................................. 11-199616

(51) Int. Cl.
*B29D 11/00* (2006.01)
(52) U.S. Cl. ...................... 264/1.24; 264/1.31; 264/2.7
(58) Field of Classification Search ................. 264/1.1, 264/1.31, 2.7, 1.24; 425/389, 365, 808, 810
See application file for complete search history.

(56) References Cited

U.S. PATENT DOCUMENTS

| 4,992,321 A | * | 2/1991 | Kandachi et al. | |
|---|---|---|---|---|
| 5,427,599 A | * | 6/1995 | Greschner et al. | ........... 425/389 |
| 5,780,373 A | * | 7/1998 | Yanagisawa et al. | |

FOREIGN PATENT DOCUMENTS

| EP | 0 691 551 | 1/1996 |
|---|---|---|
| EP | 0 860 720 | 8/1998 |
| JP | 2-27539 | 1/1990 |
| JP | 4-16315 | 1/1992 |
| JP | 5-312971 | 11/1993 |
| JP | 8-320420 | 12/1996 |
| JP | 10-96808 | 4/1998 |
| JP | 11-263627 | 9/1999 |

OTHER PUBLICATIONS

"Optronics", No. 8, 1998, pp. 85-90 (in Japanese) with partial English translation (provided by client).
Becker H et al., "Microfluidic Manifolds by Polymer Hot Embossing for µ-Tas Applications", 1998, Micro Total Analysis Systems Proceedings of the Utas Workshop, pp. 253-256, XP000934055.
Gale M.T. et al., "Polymer and III-V Transducer Platforms for Integrated Optical Sensors", Optical Engineering Soc. Of Photo-Optical Instrumentation Engineers. Bellingham, US, vol. 34, NR. 8, pp. 2396-2406, XP000518235 ISSN: 0091-3286.
Gale M.T., "Replication Techniques for Diffractive Optical Elements", Microelectronic Engineering, Elsevier Publishers BV., Amsterdam, NL, vol. 34, NR. 3-4, pp. 321-339, XP004108296 ISSN: 0167-9317.

* cited by examiner

*Primary Examiner*—Mathieu D. Vargot
(74) *Attorney, Agent, or Firm*—Smith, Gambrell & Russell, LLP

(57) ABSTRACT

A micro-shape transcription method has preparing a mold having a transcription face on which a concavo-convex pattern is formed, pressing the transcription face against a base material softened by heating, then forcibly separating the mold from the base material to transcribe a reverse pattern of the concavo-convex pattern to the surface of the base material, wherein when assuming a temperature for pressing the mold against the base material as $T_1$ (° C.), a temperature for separating the mold from the base material as $T_2$ (° C.), thermal expansion coefficients of the mold and the base material as $\alpha_a$ and $\alpha_b$, and the maximum distance between the transcription center of the transcription face and the concavo-convex pattern as d (mm), the following relations (1) and (2):

$$T_1 \geq T_2 \tag{1}$$

$$|\alpha_a - \alpha_b| \cdot (T_1 - T_2) \cdot d \leq 4 \times 10^{-2} \tag{2}$$

are simultaneously satisfied.

15 Claims, 9 Drawing Sheets

MICRO-SHAPE TRANSCRIPTION METHOD, MICRO-SHAPE TRANSCRIPTION APPARATUS, AND OPTICAL-COMPONENT MANUFACTURE METHOD

BACKGROUND OF THE INVENTION

1. Field of the Invention

The present invention relates to a method for micro-fabricating a surface of a base material and a method for manufacturing an optical component whose surface is micro-fabricated such as an optical waveguide, diffraction grating, or polarizer.

2. Related Art of the Invention

Because optical-unit related markets such as those of optical communication, optical disk, display, and optical sensor have been progressed, coexistence of high performance and low cost is requested for an optical component. Particularly, price reduction is requested for a passive optical component that itself does not operate.

Particularly, optical waveguides and diffraction gratings require a very fine and accurate pattern for their surfaces. Dry etching frequently used for a semiconductor process is generally used to form the above pattern. As an example of micro-fabrication by dry etching, a process for manufacturing a single-mode optical waveguide for optical communication is described below by referring to the accompanying drawings.

FIG. 7(a) is a top view of a general quartz-based single-mode optical waveguide and FIG. 7(b) is a sectional view of the waveguide in FIG. 7(a), taken along the line A—A in FIG. 7(a). Because a core 71 has a refractive index higher than that of a clad 72, the light meeting a specific condition is transmitted by being confined in a core pattern. By patterning the core 71 as shown in FIG. 7(a), it is possible to constitute an optical circuit. In a wavelength band of 1.3 to 1.55 $\mu$m, the core 71 generally has a square cross section one side of which is approx. 8 $\mu$m. A core shape and a core-surface roughness greatly influence a light propagation performance.

FIGS. 8(a) to 8(c) are process charts showing a general manufacture method for a conventional quartz-based optical waveguide (refer to Kawauchi, OPTRONICS No. 8,851, 1988). In the illustrated steps, a core film 81 is formed on a quartz substrate 82 also serving as a lower clad layer in accordance with the flame deposition method (FIG. 8(a)). However, when using a substrate other than a quartz substrate, a lower clad layer is previously formed in accordance with the flame deposition method. Then, a core film is formed into a predetermined pattern through photolithography and dry etching (FIG. 8(b)). An upper clad layer 83 is then formed in accordance with the flame deposition method (FIG. 8(c)). An optical waveguide having a small loss has been manufactured so far in accordance with the above method.

In recent years, however, not only quartz but also resin have been studied as an optical-waveguide material. At present, resin is inferior to quartz in transparency and reliability. Resin is easily molded and superior in transparency at a wavelength of approx. 650 to 850 nm, however. Therefore, it is a very prospective optical-waveguide material. Polymethyl methacrylate (PMMA) superior in transparency is known as a specific resin. Recently, it is also studied to realize low absorption in a wavelength area of 1.3 to 1.55 $\mu$m by performing deuteration or fluorination on the basis of PMMA.

To manufacture an optical waveguide by using resin, a method is generally used in which a core layer and a clad layer are formed mainly by spin coating and the core layer is patterned by dry etching. Resin has a high productivity because it has a short film deposition time and a low annealing temperature of 200 to 300° C. compared to quartz.

As described above, dry etching is used to pattern a core of quartz or resin in the case of conventional optical-waveguide manufacturing.

However, dry etching is a complex process and requires a lot of equipment. Therefore, when considering cost, it cannot be said that dry etching is suitable for manufacturing a passive optical component, setting aside a semiconductor device. Therefore, various methods are proposed for manufacturing an optical component. Particularly, pressing-molding and injection-molding methods are prospective.

Proposed examples of press-molding are exclusively directed to glass materials and include a method disclosed in the specification of Japanese Patent Laid-Open No. 8-320420. The method is an optical-waveguide manufacturing method of simultaneously forming groove portions serving as core patterns by pressing a mold 91 on which a predetermined core pattern 92 is formed against a base material 93 also serving as a lower clad at a high temperature as shown in FIG. 9. The method makes it possible to efficiently form an optical waveguide by omitting the photolithography and dry-etching steps which have been used so far.

A method is also proposed in which a diffraction grating is manufactured by transcripting a pattern on a metal reflection film using pressing-molding (the specification of Japanese Patent Laid-Open No. 10-96808).

A micro-pattern transcription method using pressing-molding disclosed in the specification of Japanese Patent Laid-Open No. 8-320420 is briefly described below. First, a base material (workpiece) is heated and softened and brought into contact with a mold. While keeping the above state, the base material is cooled and separated from the mold when the shape of the base material is fixed. In this case, as shown in FIG. 10, a convex portion 103 formed on a mold 101 is provided correspondingly to a required waveguide pattern and pressed against a resin substrate 102, and a reverse pattern is formed on the resin substrate 102.

However, when using the above transcription method, a high pattern accuracy may not be obtained. Deterioration of the pattern accuracy seems to be caused by a difference between thermal expansion coefficients. That is, when bringing the base material softened by heating into contact with the mold and cooling the base material and the mold, a thermal stress is generated due to a difference between thermal expansion coefficients of the base material and mold. As a result, the accuracy of a pattern transcribed to the base material is lowered and the mold is broken if the mold is weak in strength. This problem becomes remarkable when using resin because resin has a thermal expansion coefficient 1 to 2 digits larger than that of quartz used as the material of a mold.

According to specific study by the present inventor, the width of a groove is increased at a micron-order level and the shape of the groove is deformed by transcribing a pattern to a resin substrate by using a mold. It is estimated that this phenomenon results from the fact that the resin substrate contracts toward the center of transcription because the substrate contracts more than the mold. This phenomenon remarkably occurs when a transcription face is a plane. Moreover, when the cross-section of a micro shape is rectangular, a pattern is further deformed.

Thus, resin can be molded at a low temperature and it is advantageous in the manufacturing cost. However, it has a problem that a micro pattern cannot be accurately transcribed when transcribing a pattern by pressing-molding.

SUMMARY OF THE INVENTION

The present invention is made to solve the conventional problems and its object is to provide a method for efficiently transcribing a high-accuracy micro shape.

It is another object of the present invention to provide a method for fabricating an optical component such as an optical waveguide by using the above transcription method.

To achieve the above objects, a micro-shape transcription method of the present invention is a micro-shape transcription method comprising preparing a mold with a transcription face and including a concavo-convex pattern formed on the transcription face, pressing the transcription face against a base material softened by heating and then forcibly separating the mold from the base material, to transcribe a reverse pattern of the concavo-convex pattern to the surface of the base material, wherein when assuming a temperature for pressing the mold against the base material as $T_1(° C.)$, a temperature for separating the mold from the base material as $T_2(° C.)$, thermal expansion coefficients of the mold and the base material as $\alpha_a$ and $\alpha_b$, and the maximum distance between the transcription center of the transcription face and the concavo-convex pattern as d (mm), the following relations (1) and (2) are simultaneously satisfied.

$$T_1 \geq T_2 \quad (1)$$

$$|\alpha_a - \alpha_b| \cdot (T_1 - T_2) \cdot d \leq 4 \times 10^{-2} \quad (2).$$

The present invention is particularly preferable when the transcription face of a mold is a plane or a stepped plane.

Moreover, the present invention is particularly preferable when the sectional form of a concavo-convex pattern is rectangular.

Furthermore, the present invention is particularly preferable when $|\alpha_a|\alpha_b|$ is equal to or higher than $50 \times 10^{-7}/° C$.

Furthermore, the present invention is particularly preferable when the line width of a concavo-convex pattern is equal to or less than 100 μm.

Furthermore, the present invention is particularly preferable when the depth of a concavo-convex pattern is equal to or more than 1 μm.

Furthermore, in the above described method of the present invention, a base material is preferably an optically transparent thermoplastic resin or glass. It is preferable to use any one of polyolefin, polymethyl methacrylate, polycarbonate, norbornane, and acrylic resins as the thermoplastic resin.

A micro-shape transcription apparatus of the present invention comprises a first mold provided with a transcription face having a micro-shape, a second mold facing the first mold, a mechanism for driving either of the first and second molds, a heating source for controlling the temperatures of the first and second molds, and a vacuum chuck for attracting and fixing a base material to the second mold.

An optical-component manufacturing method of the present invention forms a pattern for controlling light in accordance with the above-described micro-shape transcription method. An optical component of the present invention includes an optical waveguide, diffraction grating, polarizer, or lens. When the optical component is an optical waveguide, a pattern corresponding to a core is formed in accordance with a micro-shape transcription method of the present invention.

DETAILED DESCRIPTION OF THE PREFERRED EMBODIMENTS

Embodiments of the present invention are described below by referring to the accompanying drawings.

Figure 1:
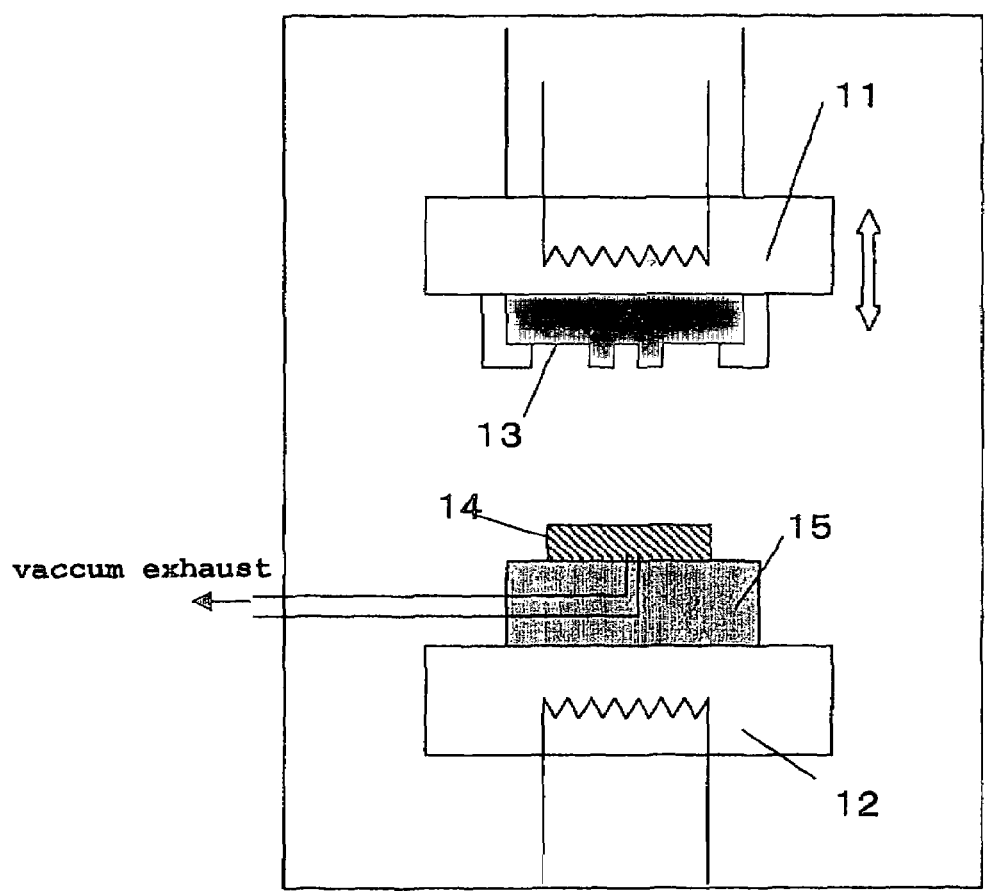
FIG. 1 is a sectional view showing a configuration of a pressing machine used for an embodiment of a micro-shape transcription method of the present invention.
Figure 2A:
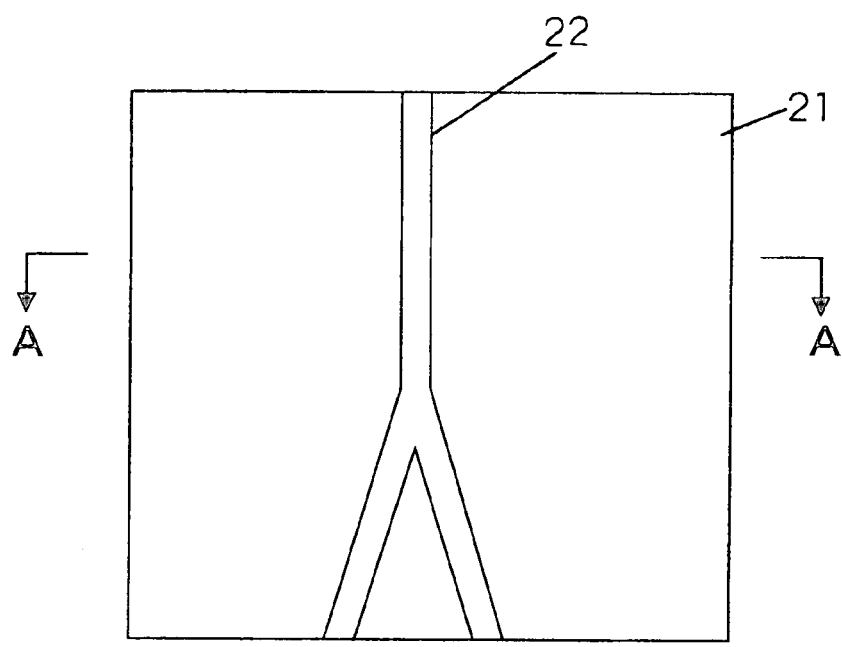
FIGS. 2(a) and 2(b) are illustrations showing a pattern formed on a transcription face of a mold used for an embodiment of a micro-shape transcription method of the present invention.
Figure 2B:
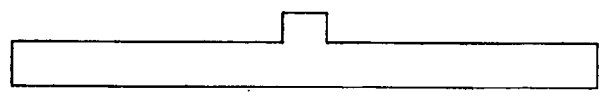

FIG. 1 shows a pressing machine used for a micro-shape transcription method of the present invention. The machine is provided with a pair of upper and lower heater blocks 11 and 12. The upper heater block 11 is vertically movable and the lower heater block 12 is fixed. A cope 13 is fixed to the upper heater block 11 with the transcription face turning downward. The cope 13 is made of quarts having a size of 20×20 mm and has a micro shape formed through dry etching on the flat transcription face. FIGS. 2(a) and 2(b) show a pattern formed on the transcription face of a cope 21. FIG. 2(a) is a top view of the pattern and FIG. 2(b) is a sectional view of the pattern in FIG. 2(a), taken along the line A—A in FIG. 2(a). In this case, the pattern is convex. The convex pattern 22 has a depth of approx. 5 μm and a width of approx. 8 μm.

In this case, a polyolefin-based thermoplastic resin is used as a base material 14 to be formed. This resin is optically transparent and has a glass-transition temperature of 140° C. and a load deflection temperature of 123° C. The base material has a size of 8×8 mm and is set on a planar drag 15 fixed on the lower heater block 12. The base material 14 is fixed to the drag 15 by a vacuum chuck.

A micro-shape transcription method is described below by referring to FIG. 1.

The quartz mold 13 serving as a cope and the resin substrate 14 serving as a workpiece are overlapped at the molding machine so that the transcription face of the quartz mold 13 contacts with the resin substrate 14. In this case, the center of the quartz mold 13 is almost adjusted to the center of the resin substrate 14. Under the above state, the upper and lower heater blocks 11 and 12 are electrified, the resin substrate 14 is heated up to 180° C. to be softened, and the upper heater block 11 to which the quartz mold 13 is fixed is moved downward and pressed. While a convex pattern of the quartz mold 13 bites into the resin substrate 14, heater temperature is lowered to 150° C. by controlling electrification of upper and lower heaters and the upper heater block 11 is raised to forcibly separate the cope 13 from the resin substrate 14. In this case, the resin substrate 14 is fixed to the drag 15 by a vacuum chuck and smoothly separated from the cope 13 without being distorted or deformed. Thereafter, the resin substrate 14 is cooled up to approx. room temperature and taken out of the molding machine.

As a result of observing the surface and cross section of the taken-out resin substrate by an optical microscope and an electron microscope, the groove of a micro-pattern to which the convex pattern of the quartz mold is accurately transcribed is confirmed over the entire surface of a resin substrate having a diameter of approx. 20 mm.

Figure 3:
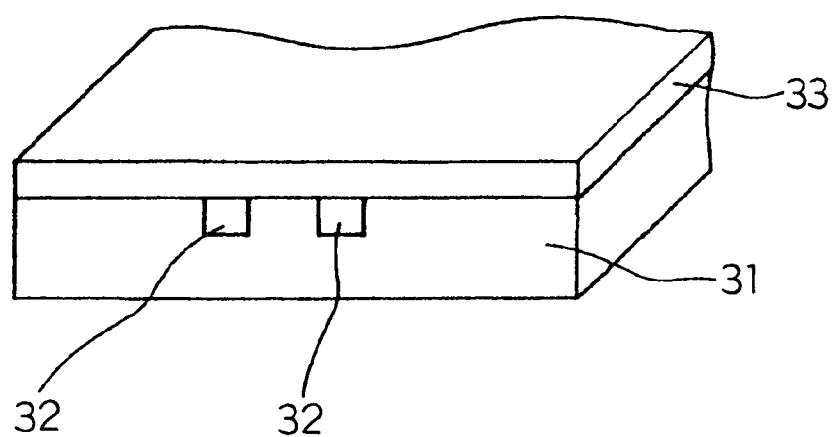
FIG. 3 is a sectional perspective view showing an example of an optical waveguide formed by the machine shown in FIG. 1.

Then, epoxy resin having a refractive index approx. 0.3% higher than that of the resin substrate is embedded in the groove of the resin substrate and a flat resin substrate made of the same material as the above resin substrate is bonded onto the above resin substrate. Thus, the optical waveguide shown in FIG. 3 is fabricated.

The optical waveguide is provided with epoxy resin as a core 32 and polyolefin resin substrates as clads 31, 33. The optical waveguide has a sufficient serviceability.

Moreover, molding is studied by using a molding temperature which is a temperature for pressing a mold against a resin substrate and a mold releasing temperature which is a temperature for releasing the mold from the resin substrate as parameters and the resin substrate is observed after molding. Table 1 shows an example of observation results.

TABLE 1

| Molding temperature | Mold releasing temperature | Transcription-quality evaluation |
|---|---|---|
| 160 | 80 | X |
| 160 | 90 | X |
| 160 | 100 | ○ |
| 160 | 120 | ○ |
| 160 | 140 | ○ |
| 180 | 80 | X |
| 180 | 100 | X |
| 180 | 120 | ○ |
| 180 | 150 | ○ |

In the case of Table 1, the quality of a transcription shape is observed at a position 1 cm separate from the transcription center of a transcription face. In this case, an object transcribed at a submicron accuracy is judged as ○ and an object not transcribed at a submicron accuracy is judged as x.

Figure 4:
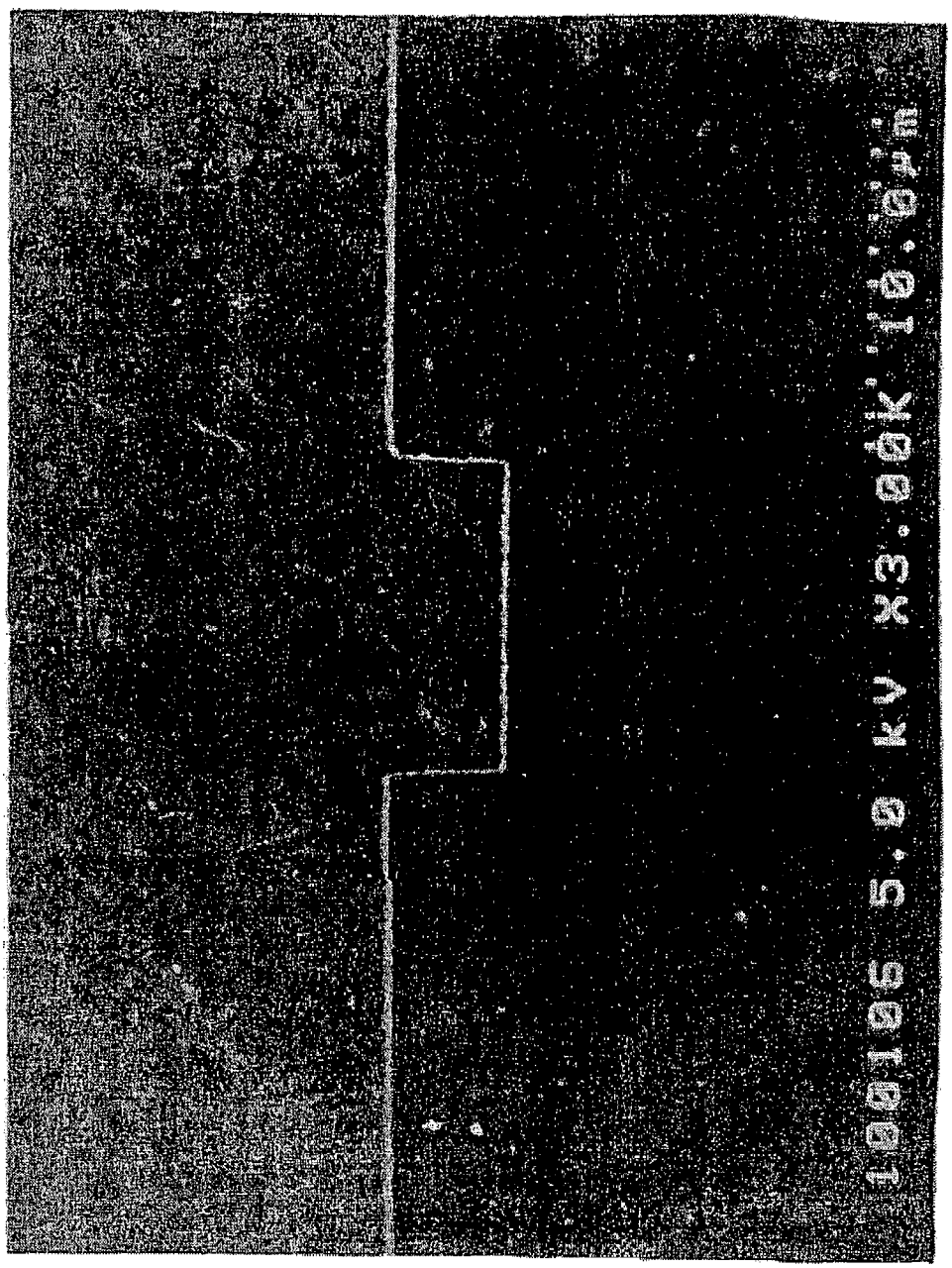
FIG. 4 is an SEM photograph of a cross section of a resin substrate obtaining a preferable transcription quality from an embodiment of the present invention.
Figure 5:
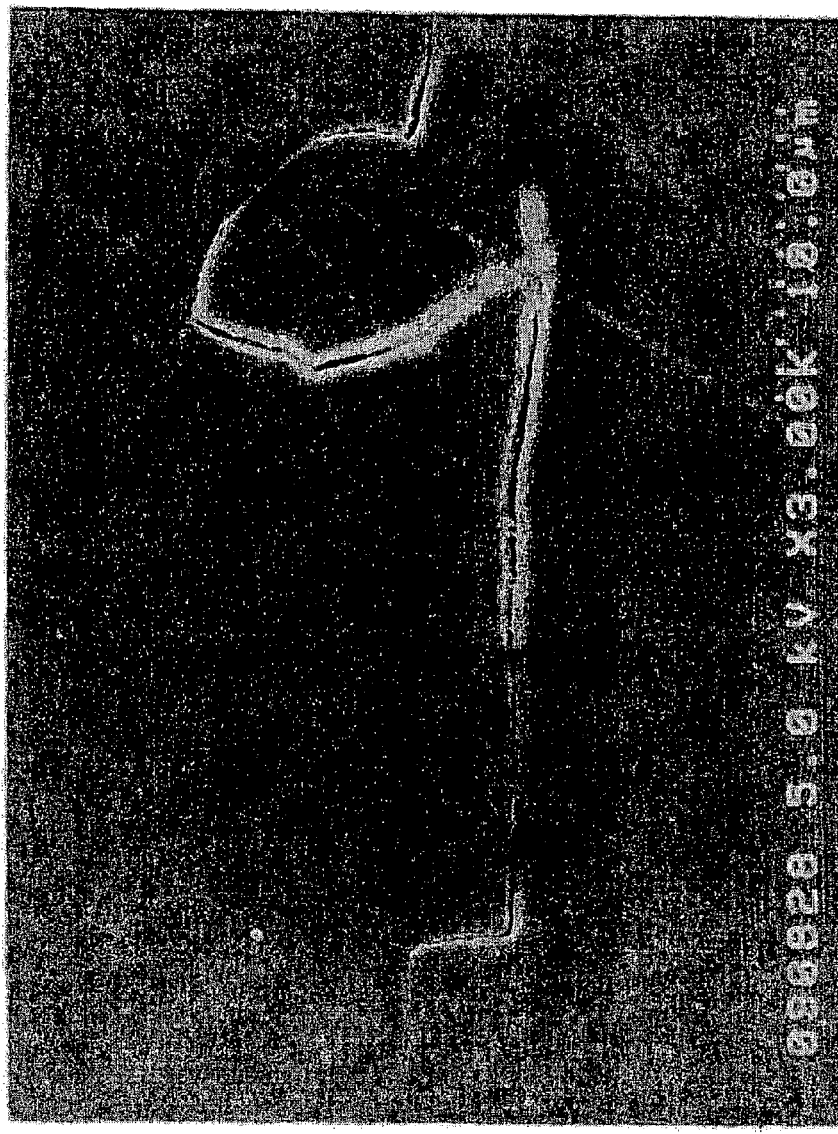
FIG. 5 is an SEM photograph of a cross section of a resin substrate obtaining a bad transcription quality from an embodiment of the present invention.

FIGS. 4 and 5 show electron micrographs of the cross sections of a groove transcribed onto a resin substrate.

In the case of FIGS. 4 and 5, cross sections are obtained by coating the formed resin substrate with a metallic film, embedding it in epoxy resin, and polishing it, and lower portions show the formed substrate. A while boundary line shows the metallic film. FIG. 4 is obtained at a molding temperature of 180° C. and a mold releasing temperature of 150° C. at which the transcription quality is judged to be good, and FIG. 5 is obtained at a molding temperature of 180° C. and a mold releasing temperature of 80° C. at which the transcription quality is judged to be bad.

Figure 6:
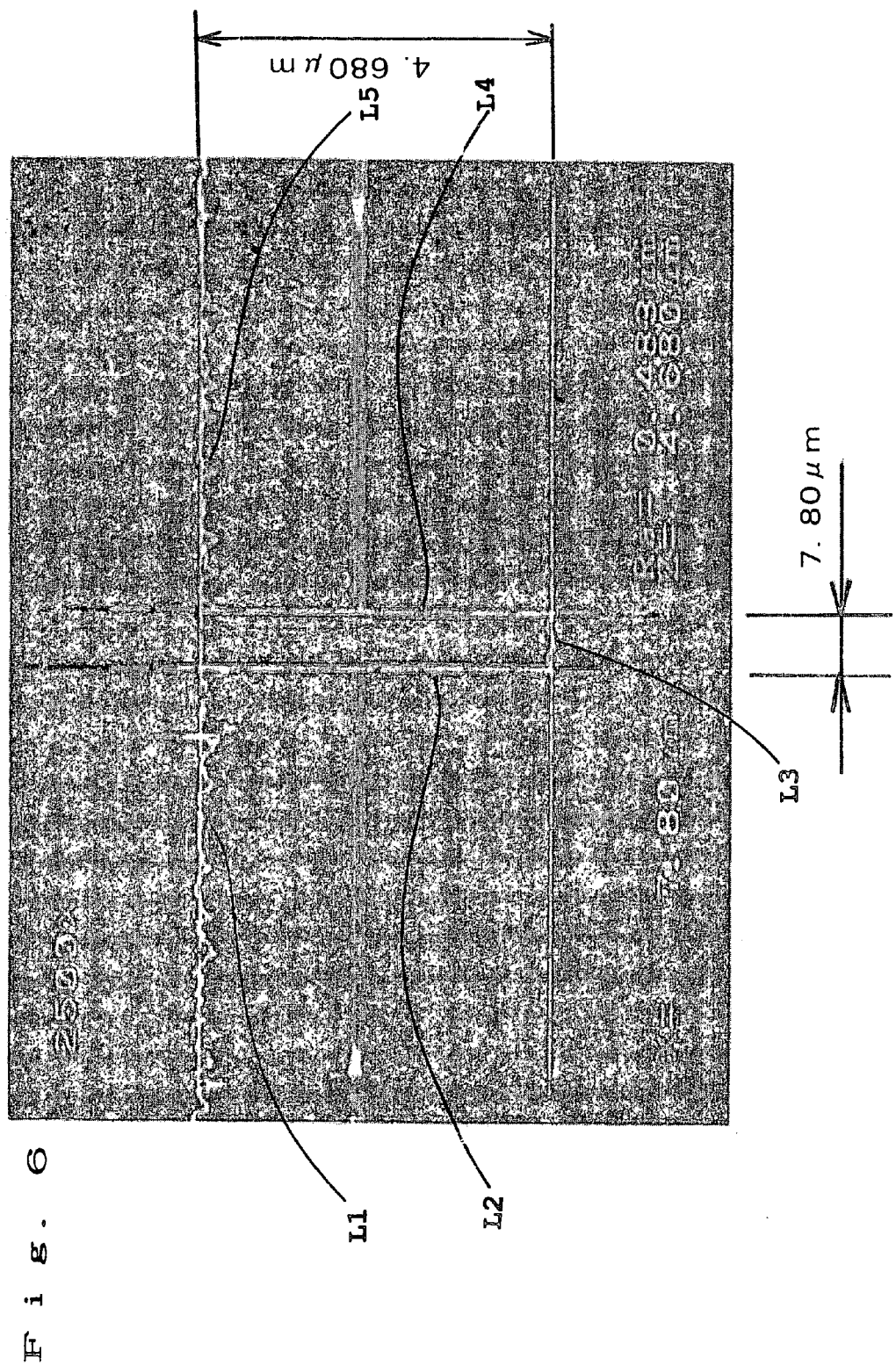
FIG. 6 is a photograph showing a result of measuring the surface shape of a resin substrate obtaining a preferable transcription quality by an embodiment of the present invention.
Figure 7A:
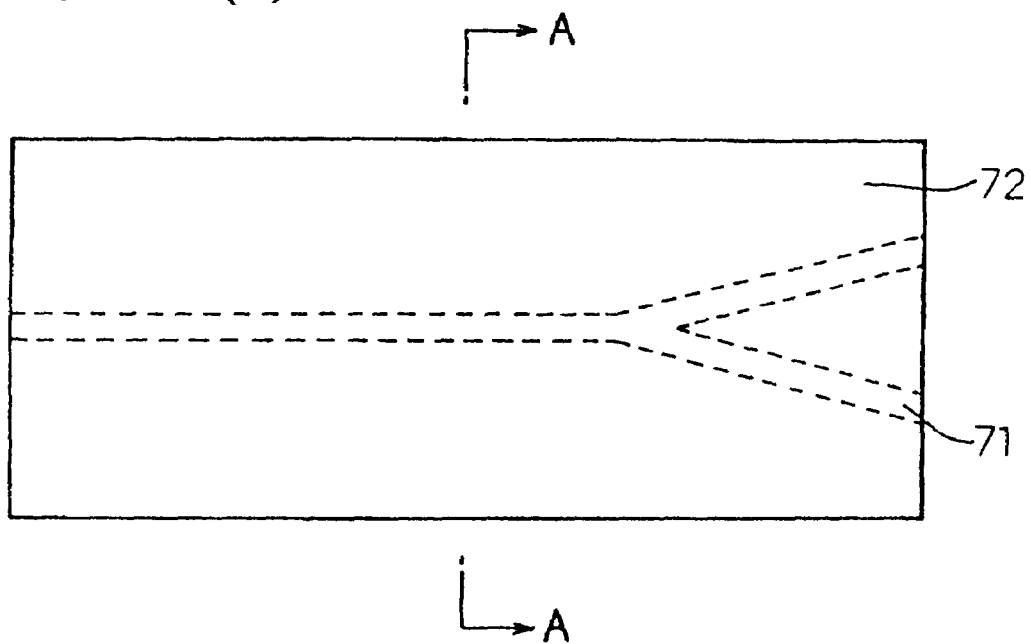
FIG. 7(a) is a top view of a general quartz-based single-mode optical waveguide and FIG. 7(b) is a sectional view of the waveguide in FIG. 7(a)
Figure 7B:
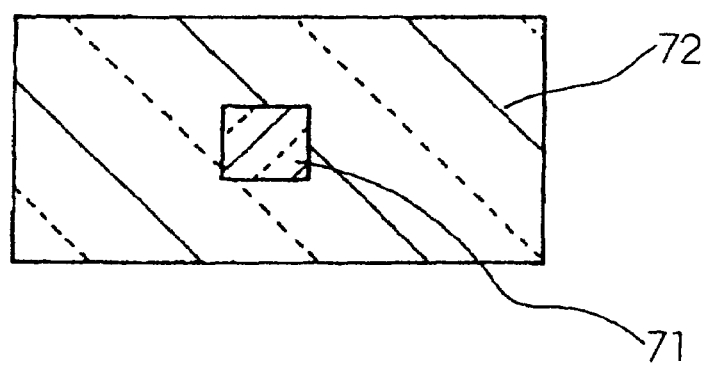
Figure 8A:
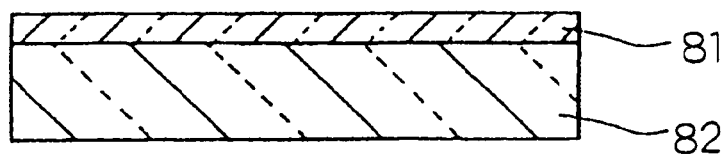
FIGS. 8(a) to 8(c) are process charts showing a method for manufacturing a conventional general optical waveguide.
Figure 8B:
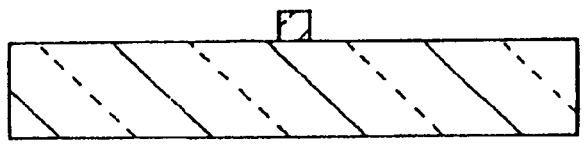
Figure 8C:
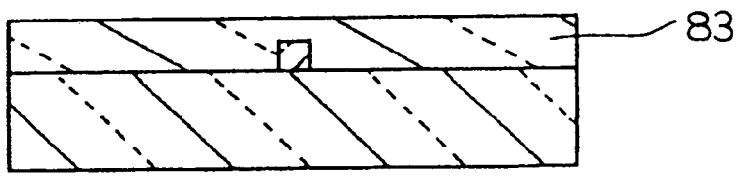
Figure 9:
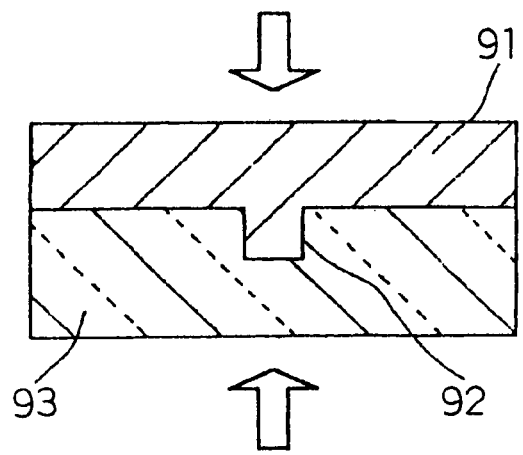
FIG. 9 is a sectional view showing a conventional method for manufacturing an optical waveguide through pressing.
Figure 10:
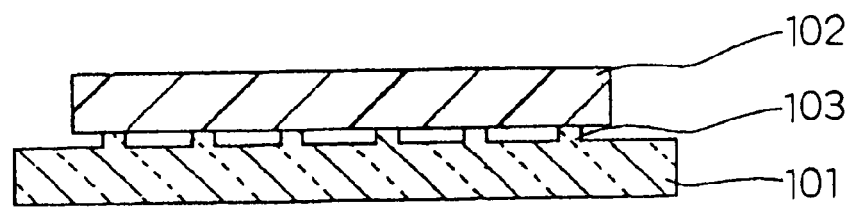
FIG. 10 is a conventional pattern used for a method for manufacturing an optical waveguide through pressing.

FIG. 6 shows the result of measurement of the surface roughness of a groove pattern, which was obtained at a molding temperature of 180° C. and a mold releasing temperature of 150° C. at which the transcription quality is judged to be good, by a non-contact roughness meter.

The photograph is overlapped with a photograph when viewing a groove from the surface, the sectional form is shown by leader lines L1 to L5, and the groove has a width of 7.8 μm and a depth of 4.68 μm. The irregularity of the surface of the molded resin substrate is originally present on a quartz mold.

Thereby, it is confirmed that the groove is vertical and transcribed at a roughness of a submicron level or lower. That is, it is found that transcription is smoothly performed even if measuring methods are changed.

The following Equation 1 is calculated on the above result.

[Equation 1]

$$M = |\alpha_a - \alpha_b| \cdot (T_1 - T_2) \cdot d \qquad \text{Equation 1}$$

In the above Equation, $\alpha_a$ denotes a thermal expansion coefficient of quartz serving as a mold and $\alpha_b$ denotes a thermal expansion coefficient of polyolefin-based resin serving as a workpiece, in which $\alpha_a$ is equal to $5 \times 10^{-7}/°$ C. and $\alpha_b$ is equal to $600 \times 10^{-7}/°$ C. Moreover, $T_1$ denotes a molding temperature and $T_2$ denotes a mold releasing temperature. Symbol d (mm) denotes the distance between the position at which transcription quality is evaluated and the transcription center.

As a result of calculating the Equation 1 on each molding condition in Table 1, it is found that a preferable transcription quality is obtained in the case of $M \leq 4 \times 10^{-2}$. As for the above relation, it is found that the same result is obtained even if using one of polymethyl-methacrylate-, polycarbonate-, acrylic-, and norbornane-based thermoplastic resins or glass for a substrate to be molded, using one of various metals including nickel, various ceramics including zirconium, WC-based cemented carbide, diamond film, and DLC for a mold base material, combining various mold materials with a material to be molded, and changing molding conditions. That is, it is clarified that a micro shape can be transcribed as long as a molding condition meets the condition of Expression 1.

In this embodiment, manufacturing of an optical waveguide is described. However, a method of the present invention is not restricted to the above case but it is suitable for manufacturing all components requiring a micro pattern including an optical component, mechanical component, and micromechanics-related component. It is particularly suitable for manufacturing a high-accuracy optical component including an optical waveguide, diffraction grating, polarizer and lenz.

Moreover, for this embodiment, a mold provided with a convex pattern is used. However, the same advantage can be obtained by using a concave pattern or a concavo-convex pattern. A pattern sectional form is not restricted. For example, the mold is effective for a trapezoidal shape, triangular shape, or wave shape. The mold is particularly effective for a micro shape having a rectangular cross section on a flat transcription face that is easily influenced by thermal expansion and on which a pattern easily collapses.

Moreover, for this embodiment, the flat pattern shape shown in FIG. 2 is described. However, a pattern shape is not restricted to the flat pattern shape.

Furthermore, as a result of studying various materials, it is found that a method of the present invention is particularly effective when a difference between thermal expansion coefficients of a mold and a base material is $50 \times 10^{-7}/°$ C. or more, a pattern has a width of 100 μm or less, and a concavo-convex pattern has a depth of 1 μm or more. That is, under the above conditions, separation cannot be made by a conventional method but separation can be realized by the present invention.

Moreover, though a material of a mold or a material to be molded is not restricted, the mold is particularly effective for a thermoplastic resin having a comparatively large thermal expansion coefficient. By applying protective coating to a mold and performing molding in an inert-gas atmosphere, it is possible to transcribe a micro pattern to glass.

As described above, the present invention makes it possible to efficiently transcribe a high-accuracy micro pattern.

Moreover, the present invention makes it possible to efficiently manufacture an optical component such as an optical waveguide.

Particularly, the present invention makes it possible to accurately transcribe a micro pattern to a wide area of resin having a large thermal expansion coefficient that is a problem as a material of an optical component.

Thus, according to the present invention, it is possible to efficiently manufacture various optical components including an optical waveguide and a diffraction grating.

What is claimed is:

1. A micro-shape transcription method for producing an optical waveguide or a diffraction grating from thermoplastic resin, said method comprising:

pressing a mold having a transcription face against the thermoplastic resin as a base material heated to a pressing temperature to transcribe a micro pattern to a surface of the base material, the transcription face having a concavo-convex pattern thereon, separating the mold from the base material at a separating temperature, wherein when assuming a temperature for pressing the mold against the base material as $T_1$ (° C.), a temperature for separating the mold from the base material as $T_2$ (° C.), thermal expansion coefficients of the mold and the base material as $\alpha_a$ and $\alpha_b$, and the maximum distance between a transcription center of the transcription face and the concavo-convex pattern as d (mm), timing of forcibly separating the mold from the base material is determined so that the following relations (1) and (2):

$$T_1 \geq T_2 \quad (1)$$

$$|\alpha_a - \alpha_b| \cdot (T_1 - T_2) \cdot d \leq 4 \times 10^{-2} \quad (2)$$

are simultaneously satisfied.

2. The micro-shape transcription method according to claim 1, wherein the transcription face of the mold is a plane or stepped plane.

3. The micro-shape transcription method according to claim 1 or 2, wherein the transcription face has a line width of 100 μm or less.

4. The micro-shape transcription method according to claim 1 or 2, wherein the transcription face has a depth of 1 μm or more.

5. The micro-shape transcription method according to claim 1 or 2, wherein the thermoplastic resin comprises an optically-transparent resin.

6. The micro-shape transcription method according to claim 5, wherein the thermoplastic resin is selected from the group consisting of polyolefin-, polymethyl-methacrylate-, polycarbonate-, norbornane-, and acrylic-based resins.

7. An optical-component manufacturing method wherein a pattern for controlling light of an optical component is formed in accordance with the micro-shape transcription method of claim 1.

8. An optical component manufacturing method wherein a pattern corresponding to a core of an optical waveguide is formed in accordance with the micro-shape transcription method of claim 1.

9. The micro-shape transcription method of claim 1, wherein:
the pressing temperature is about 160° C., and
the separating temperature is from 100–140° C.

10. The optical-component manufacturing method according to claim 7 or 8, wherein the base material has a first refractive index, said method further comprising:
embedding a resin having a second refractive index that differs from the first refractive index of the base material into the pattern.

11. The optical-component manufacturing method according to claim 10, further comprising:
placing a layer over the resin embedded in the pattern.

12. The optical-component manufacturing method according to claim 11, wherein the base material and the layer comprise a second resin.

13. The optical-component manufacturing method according to claim 12, wherein the second resin is a polyolefin resin.

14. The optical-component manufacturing method according to claim 8, further comprising:
embedding an epoxy resin having a refractive index approximately 0.3% higher than the base material into the pattern to form the core having a top surface and a bottom surface; and
placing a covering material on the top surface of the core.

15. The micro-shape transcription method of claim 1, wherein:
the pressing temperature is about 180° C., and the separating temperature is from 120–150° C.

* * * * *

UNITED STATES PATENT AND TRADEMARK OFFICE
CERTIFICATE OF CORRECTION

PATENT NO. : 6,989,114 B1 Page 1 of 1
APPLICATION NO. : 09/609250
DATED : January 24, 2006
INVENTOR(S) : Korenaga et al.

It is certified that error appears in the above-identified patent and that said Letters Patent is hereby corrected as shown below:

IN THE ABSTRACT: Item [57]
"° C." is changed to --° C-- in lines 8 and 10.

IN THE SPECIFICATION:
"° C." is changed to --° C-- in
col. 2, line 6;
col. 3, line 23 and 25;
col. 4, line 61;
col. 5, lines 8 and 12;
col. 6, lines 1, 2, 4, 8, 9, and 30; and
col. 7, line 7.

IN THE CLAIMS:
"° C." is changed to --° C-- in
claim 1, lines 12 and 13;
claim 9, line 3; and
claim 15, line 3.

Signed and Sealed this

Twenty-ninth Day of August, 2006

JON W. DUDAS
*Director of the United States Patent and Trademark Office*